United States Patent [19]

Fujii et al.

[11] Patent Number: 5,334,636
[45] Date of Patent: Aug. 2, 1994

[54] THERMOPLASTIC COMPOSITION

[75] Inventors: Takeshi Fujii, Sodegaura; Manabu Ishikawa, Ichihara, both of Japan

[73] Assignee: Sumitomo Chemical Company, Limited, Osaka, Japan

[21] Appl. No.: 858,185

[22] Filed: Mar. 26, 1992

[51] Int. Cl.$^5$ .................. C08L 23/16; C08L 71/12; C08K 3/04
[52] U.S. Cl. .................. 524/449; 524/451; 524/496; 524/910; 525/68
[58] Field of Search .................. 525/68; 524/449, 451, 524/496, 910

[56] References Cited

U.S. PATENT DOCUMENTS

| | | |
|---|---|---|
| 3,383,435 | 5/1968 | Cizek . |
| 3,697,450 | 10/1972 | Takenaka et al. . |
| 4,373,052 | 2/1983 | Abolins et al. .................. 524/451 |
| 4,559,164 | 12/1985 | Kostelnik et al. .................. 525/496 |
| 4,929,675 | 5/1990 | Abe et al. .................. 525/68 |
| 5,023,036 | 6/1991 | Lee et al. .................. 525/187 |

FOREIGN PATENT DOCUMENTS

| | | |
|---|---|---|
| 0077059 | 4/1983 | European Pat. Off. . |
| 0355602 | 2/1990 | European Pat. Off. . |
| 0450483 | 10/1991 | European Pat. Off. . |
| 60-124654 | 7/1985 | Japan . |
| 62-172059 | 7/1987 | Japan . |
| 376815 | 7/1973 | U.S.S.R. . |

OTHER PUBLICATIONS

Patent Abstracts of Japan, vol. 11, No. 315 (C-451) Oct. 14, 1987 & JP-A-62 100 553 (Tokyo Ink).
Database WPIL, Section Ch, Week 30, Derwent Publications Ltd., London, GB; Class A85, AN 85-180027 & JP-A-60 106 848 (Showa Denko) Jun. 12, 1985.

*Primary Examiner*—James J. Seidleck
*Assistant Examiner*—Thomas Hamilton, III
*Attorney, Agent, or Firm*—Sughrue, Mion, Zinn, Macpeak & Seas

[57] ABSTRACT

There is provided a polymer composition comprising,
A) a polyphenylene ether resin and,
B) optionally a styrene resin and,
C) optionally impact strength improving amount of one or more of impact strength improving polymer(s) and,
D) from about 5 parts to about 20 parts by weight of at least one mineral filler selected from the group consisting of talc, mica, and wollastonite based on 100 parts by weight of the total of the polymers, A) the polyphenylene ether resin, B) the styrene resin, and C) the impact strength improving polymer and,
E) from about 5 parts to about 40 parts by weight of a carbon black based on the total of the polymers, A) the polyphenylene ether resin, B) the styrene resin, and C) the impact strength improving polymer and,
F) optionally plasticizing amount of one or more of plasticizer(s), characterized in that the surface resistivity of the composition is lower than about $10^{10}$ ohm.

6 Claims, No Drawings

THERMOPLASTIC COMPOSITION

BACKGROUND OF THE INVENTION

The term polyphenylene ether resin is well known to those skilled in the art as a class of thermoplastic materials having excellent physical properties such as dimensional stability, dielectric characteristics, and they are made by a variety of processes from the corresponding phenols.

Some of the polyphenylene ethers are disclosed in the prior art patent literature e.g., Hay U.S. Pat. Nos. 3,306,874, and 3,306,875 and Nakashio et al. U.S. Pat. No. 3,573,257 and the like.

Blends of a polyphenylene ether and a styrene resin are also well known to those skilled in the art and are disclosed in numerous patent literature.

Cizek U.S. Pat. No. 3,383,435 discloses polyphenylene ether/rubber modified styrene resin compositions, wherein the rubber component being unsaturated type such as polybutadiene.

Nakashio et al. U.S. Pat. No. 3,658,495 discloses polyphenylene ether/rubber modified styrene resin compositions wherein the rubber component being ethylene/alpha-olefin/polyene terpolymer.

Haaf U.S. Pat. No. 4,167,507 discloses blends of polyphenylene ether and a partially hydrogenated styrene/-conjugated diene block copolymer such as Shell Chemical's Kraton G's.

Blends of polyphenylene ether and mineral fillers are well known and are disclosed in patent literature.

Lee Jr. U.S. Pat. No. 4,166,812 discloses blends of polyphenylene ether, rubber modified polystyrene and aluminosilicate filler.

Cooper et al. U.S. Pat. No. 3,959,211 discloses blends of polyphenylene ether, rubber modified polystyrene wherein the rubber component is ethylene-propylene-diene terpolymer, triphenyl phosphate, and mineral filler such as titanium dioxide.

Abolins et al. U.S. Pat. No. 4,373,052 discloses blends of polyphenylene ether, rubber modified polystyrene, triphenyl phosphate and talc filler.

Abolins U.S. Pat. No. 4,478,970 discloses blends of polyphenylene ether, triphenyl phosphate and clay filler. Thermoplastic compositions containing electro conductive materials such as metal flakes, metal fibers, carbon fibers, carbon blacks, or the combination thereof, have long been used for the purpose of rendering the plastic components fabricated therefrom electromagnetic interference shielding characteristics or providing plastic components with higher electroconductivity or antistatic electricity characteristics.

Cizek U.S. Pat. No. 3,383,435 teaches a blend of polyphenylene ether, polystyrene and carbon black.

Shilenko Soviet Pat. No. SU.376815 discloses a polyphenylene ether/carbon black composition.

Takenaka et al. U.S. Pat. No. 3,697,450 discloses blends of thermoplastics, electroconductive materials such as carbon black, graphite and metal powder or the combination thereof, and silicon containing mineral fillers such as silicon carbide, silica, glass powder and stone powder, and specifically discloses a blend of polyphenylene ether, carbon black and silica, the said composition having the volume resistivity of $1.2 \times 10^5$ ohm·cm.

Although the patent discloses the combined use of carbon black and silicon containing inorganic fillers such as silicon carbide, silica, stone powder and the like inter alia, the combined use of carbon black and such inorganic fillers resulted in higher resistivity as compared with the use of carbon black alone as shown in TABLE I of the patent specification.

Moreover the combined use of carbon black and other silicon containing inorganic filler than silicon carbide, silica, or glass powder is not disclosed in any of the examples of the patent.

Abolins U.S. Pat. No. 4,404,125 discloses blends of polyphenylene ether, polystyrene and electroconductive materials selected from the group consisting of aluminum flake, a combination of aluminum flake with conductive carbon blacks or carbon fibers, a combination conductive carbon blacks and carbon fibers, and carbon fibers, but does not disclose the combined use of electroconductive material and inorganic filler. Plastic components having improved electromagnetic interference shielding characteristics/electroconductivity are widely used in the electric/electronics industry.

Illustrative examples of the component are personal computer housing, CRT display housing, faximile housing, IC chip tray and the like.

Polyphenylene ether resin compositions containing electroconductive material are also commonly used in the electric/electronics industry for these applications.

In making a thermoplastic composition having electromagnetic interference shielding/electroconductive characteristics, it is desirable to achieve a required level of the characteristics with lower content of electroconductive materials.

It has now been unexpectedly discovered that a polyphenylene ether composition containing a carbon black and a mineral filler exhibits higher electroconductivity than a polyphenylene ether/carbon black blend without a mineral filler therein.

It is therefore a primary object of this invention to provide a polyphenylene ether resin composition having improved electroconductivity, or reduced electroresistivity.

Another object of this invention is to provide molded articles of a polyphenylene ether resin composition having improved electromagnetic interference shielding characteristics and/or electroconductivity.

According to the present invention there are provided thermoplastic compositions having reduced electroresistivity comprising.

A) a polyphenylene ether resin and,
B) optionally a styrene resin and,
C) optionally impact strength improving amount of one or more of impact strength improvintg polymer(s) and,
D) from about 5 parts to about 20 parts by weight of at least one mineral filler selected from the group consisting of talc, mica, and wollastonite based on 100 parts by weight of the total of the polymers, A) the polyphenylene ether resin, B) the styrene resin, and C) the impact strength improving polymer and,
E) from about 5 parts to about 40 parts by weight of a carbon black based on the total of the polymers, A) the polyphenylene ether resin, B) the styrene resin, and C) the impact strength improving polymer and,
F) optionally plasticizing amount of one or more of plasticizer(s), characterized in that the surface resistivity of the composition is lower than about $10^{10}$ ohm.

Other conventional additive such as flame retardants, stabilizers and the like may be suitably employed therein.

DETAILED DESCRIPTION

The polyphenylene ether component used in the present invention is homopolymer or copolymer composed of the following repeating unit (I) or (I) and (II):

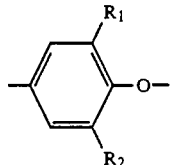 (I)

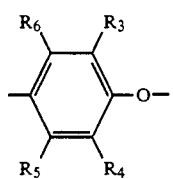 (II)

wherein $R_1$, $R_2$, $R_3$, $R_4$, $R_5$ and $R_6$ which may be identical or different, each represents a monovalent residue such as an alkyl group of 1–4 carbon atoms excluding tert-butyl group, an aryl group, a halogen atom or a hydrogen atom, and $R_3$ and $R_5$ cannot be simultaneously hydrogen atom.

The polyphenylene ether may be a mixture of the said homopolymer and the said copolymer, or a graft copolymer of the said polymers with styrene.

The homopolymer of polyphenylene ether includes poly(2,6-dimethy-1,4-phenylene)ether,
poly(2-methyl-6-ethyl-1,4-phenylene)ether,
  poly(2,6-diethyl-1,4-phenylene)ether,
  poly(2-ethyl-6-n-propyl-1,4-phenylene)ether,
  poly(2,6-di-n-propyl-1,4-phenylene)ether,
  poly(2-methyl-6-n-butyl-1,4-phenylene)ether,
  poly(2-ethyl-6-isopropyl-1,4-phenylene)ether,
  poly(2-methyl-6-chloro-1,4-phenylene)ether,
  poly(2-methyl-6-hydroxyethyl-1,4-phenylene)ether and
  poly(2-methyl-6-chloroethyl-1,4-phenylene)ether.

The copolymer of polyphenylene ether includes polyphenylene ether copolymers mainly composed of polyphenylene ether structure which is obtained by copolymerization with o-cresol or an alkyl-substituted phenol such as 2,3,6-trimethylphenol which is represented by the formula (III):

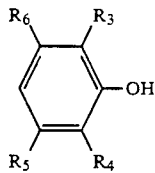 (III)

wherein $R_3 R_4 R_5$ and $R_6$ each represents a monovalent residue such as an alkyl group of 1–4 carbon atoms excluding tert-butyl group, an aryl group, a halogen atom or a hydrogen atom, and $R_3$ and $R_5$ cannot be simultaneously hydrogen atom.

Preferred polyphene ether resin is poly(2,6,-dimethyl-1,4-phenylene)ether. The styrene resins are well known in the art and are polymers or copolymers of repeating unit derived from a vinyl aromatic compound of the formula:

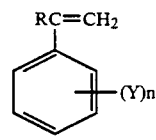

wherein R is hydrogen, lower alkyl or halogen; Y is vinyl, halogen or lower alkyl; and n is 0 or an integer of from 1 to 5.

The term "lower alkyl" means alkyl of from 1 to 6 carbon atoms.

Examples of styrene resins are homopolymers such as polystyrene and polychlorostyrene, poiystyrenes modified with natural or sythetic rubber, e.g., polybutadiene, styrene butadiene rubber, ethylene propylene copolymer rubber, ethylene butene-1 copolymer rubber, ethylene propylene polyene terpolymer rubber, urethane rubber, natural rubber and the like; styrene copolymers such as styrene acrylonitrile copolymer, styrene acrylate copolymers such as styrene methylmethacrylate copolymer, styrene maleic anhydride copolymer, styrene methyl styrene copolymer and the like, and blends of homopolystyrenes and copolymers of the aforementioned type.

The styrene resin may be present in any amount. Examples of impact strength improving polymers that may be employed in the practice of the present invention are,
  (a) polyolefins,
  b) ethylene/alpha-olefin copolymer rubbers,
  c) ethylene/alpha-olefin/polyene terpolymer rubbers,
  d) vinyl aromatic compound grafted olefin polymers of a), b), and c),
  e) functionalized aforementioned olefin polymers of a), b), and c) by grafting at least one unsaturated functional compound alone or in combination with vinyl aromatic compound thereto,
  f) copolymers or terpolymers of ethylene and at least one unsaturated functional compound,
  g) diene rubbers, and
  h) hydrogenated or nonhydrogenated block copolymers of vinyl aromatic compound and diene.

Polyolefins suitable for use in the practice of the present invention include high density polyethylene, low density polyethylene, linear low density polyethylene, propylene/ethylene blockcopolymer, polybutene-1, polyisobutylene and the like. Ethylene/alpha-olefin copolymer rubbers for use in the practice of the present invention include ehylene/propylene copolymer rubber, often called EPR, ethylene/butene-1 copolymer rubber, often called EBR, and the like. Ethylene/alpha-olefin/polyene terpolymer rubbers for use in the practice of the present invention include ethylene/propylene/ethylidenenorbornene terpolymer rubber, ethylene/propylene/dicyclopentadiene terpolymer rubber, ethylene/propylene/1,4-hexadiene terpolymer rubber and the like, often called EPDM. Examples of vinyl aromatic compound grafted olefin polymers include styrene grafted EPR, styrene grafted EPDM, styrene grafted EBR, and the like. Functionalized olefin polymers useful for the practice of the present invention include olefin polymers described in the above a), b), and c) with at least one unsaturated functional compound alone or in combination with a vinyl aromatic compound grafted thereto. The illustrative examples of the unsaturated functional compounds are acrylic acid, methacrylic acid, alkylester derivatives thereof, such as methyl(meth)acrylate, ethyl(meth)acrylate, butyl(meth-)acrylate and the like, dicarboxylic acid or acid anhydride such as fumaric acid, maleic acid, maleic anhydride, itaconic acid and the like, acrylamide, N-(hydroxyrnethyl)acrylamide, glycidyl derivatives of (meth)acrylic acid such as glycidyl (meth)acrylate, vinyl acetate, acrylonitrile, and the like. The illustrative examples of vinyl aromatic compounds are styrene, alpha-methyl styrene and the like. Method for the grafting of an unsaturated functional compound and/or vinyl aromatic compound to the olefin polymers is not critical in the practice of the present invention and any known method in the art may be employed. Melt mixing of the olefin polymers and the unsaturated functional compound and/or vinyl aromatic compound with a suitable amount of a free radical initiator may be employed. Grafting of an unsaturated functional compound and/or vinyl aromatic compound under an aqueous suspension of olefin polymers with a suitable amount of a free radical initiator and a dispersing agent may also be employed. Copolymers or terpolymers of ethylene and at least one unsaturated functional compound useful for the practice of the present invention include ethylene/(meth)acrylic acid copolymer, ethylene/alkyl(meth)acrylate copolymer, ethylene/vinylacetate copolymer, ethylene/alkyl(meth)acrylate/-maleic anhydride termpolymer, ethylene/alkyl(meth)acrylate/glycidyl(meth)acrylate terpolymer and the like.

Diene rubbers useful for the practice of the present invention include polybutadiene, styrene butadiene random copolymer, often called SBR, natural rubber, polyisoprene, and the like.

Hydrogenated or nonhydrogenated block copolymers of vinyl aromatic compound and diene are well known in the art. Illustrative examples of the block copolymers are styrene butadiene diblockcopolymer, styrene isoprene diblock copolymer, styrene butadiene styrene triblock copolymer, styrene isoprene styrene triblock copolymer, radial teleblock copolymers of styrene and butadiene, hydrogenated products of the foregoing block copolymers and the like. The foregoing impact strength improving polymer may be used alone or in any combination of one another.

Examples of preferred impact strength improving polymers are functionalized ethylene alpha-olefin (polyene) copolymer rubbers, styrene grafted ethylene alpha-olefin (polyene) copolymer rubbers, styrene/unsaturated functional monomer co-grafted ethylene alpha-olefin (polyene) copolymer rubbers, copolymers or terpolymers of ethylene and unsaturated functional monomers, hydrogenated styrene/conjugated diene block copolymers.

Although the aforementioned styrene/conjugated diene block copolymers of A-B-A or A-B type wherein A is polystyrene and B is a polymer of a conjugated diene, and hydrogenated derivatives thereof, and styrene grafted polymers such as high impmact polystyrene, styrene grafted EPDM, styrene grafted EPR, styrene grafted EBR, and styrene/unsaturated functional monomer co-grafted EPDM have good compatibility with polyphenylene ether, impact strength improving polymers other than these polymers do not exhibit very good compatibility with polyphenylene ether. If these impact strength improving polymers having lower compatibility with polyphenylene ether are to be employed, it is desirable to use compatibilizing techniques to improve the compatibility of polyphenylene ether and impact strength improving polymers having lower compatibility with polyphenylene ether.

Compatibilization of polyphenylene ether resin and other thermoplastics incompatible therewith has long been known in numerous patents and patent applications.

Ueno et al U.S. Pat. No. 4,315,086, for example, discloses compatibilized polyphenylene ether/polyamide compositions wherein the compatibilization is achieved by chemical bonding of polyphenylene ether and polyamide using a compatibilizer such as unsaturated acids and epoxy compounds.

Lee U.S. Pat. No. 4,166,055, for example, discloses polyphenylene ether/polyolefin composition wherein the compatibility of polyphenylene ether and polyolefin is enhanced by adding a hydrogenated styrene-butadienestyrene blockcopolymer.

The term "chemical compatibilization" herein used in the present invention means chemical bonding of polyphenylene ether and other thermoplastics or elastomers using a functional compound or compounds.

Examples of suitable impact strength improving polymers to be chemically compatibilized with polyphenylene ether are functionalized olefin polymers and copolymers or terpolymers of ethylene and at least one unsaturated functional monomer, herein described in e) and f) of impact strength improving polymers.

The chemical compatibilization of polyphenylene ether and an olefin polymer has also been disclosed in numerous patents and patent applications. Yamauchi et al. Japanese Kokai Patent No. Sho and 63-105022 discloses epoxy functionalized polyphenylene ether and carboxylated polyolefin.

Kitagawa et al. Japanese Kokai Patent No. Sho 63-130660 discloses a polymer composition comprising alcoholic hydroxy functionalized polyphenylene ether and maleated polyolefin.

Higashiyanagi et al. Japanese Kokai Patent No. Sho 63-221154 discloses a polymer composition comprising maleated polyphenylene ether and styrene/2-hydroxy ethylacrylate co-grafted polyolefin.

Okabe et al. Japanese Kokai Patent No. Hei 2-3442 discloses a polymer composition comprising maleated polyphyenylene ether, styrene/malelic anhydride co-grafted polyolefin and paraphenylene diamine.

Hirose Japanese Kokai Patent No. Hei 2-173137 discloses a polymer composition comprising amino group containing compound grafted polyolefin and carboxylated polyphenylene ether.

Suitable plasticizers that may be employed in the practice of the present invention include aromatic phosphate compounds such as triphenyl phosphate (TPP), mineral oil, wax, N,N'-diphenyl hexane diamide or adipic dianilide, and the like.

EMBODIMENT OF THE INVENTION

The following examples are set forth as further illustration of the present invention and are not to be construed as limiting the invention.

EXAMPLE-I

Seven thermoplastic compositions are prepared by blending, using a tumbler mixer, poly(2,6-dimethyl-1,4-phenylene) ether having a reduced viscosity of 0.46 dl/g (hereinafter referred to as PPE-A) measured at 25°

C in a chloroform solution of 0.5 g/dl concentration; high impact polystyrene (Sumitomo Kagaku's Sumibrite M-566, hereinafter referred to as HIPS), adipic dianilide (ADA) if employed, carbon black (Denki Kagaku's acetylene black, Denka Black Bead ®), with talc (MICRON WHITE ® 5000S made by HAYASHI KASEI)
, or wollastonite (NYAD ® made by NYCO)
, or mica (Repco Mica ® S-325 made by Kanada Maika)
, or without a mineral filler as a comparative example.

The formulation recipe is shown in Table I wherein the ratio of the ingredients is shown in parts by weight.

The resulting samples are individually extruded at a product output rate of about 30 kg/Hr, using Toshiba Kikai's TEM 50 twin screw extruder at a temperature of about 330° C. and pelletized, and injection molded at an injection temperature of about 320° C. and the mold temperature of about 120° C. to fabricate test plates. The molded test plates are tested for their comparative physical properties and electroresistivity at room temperature.

The data obtained are shown also in Table I.

As shown in Table-I, the combined use of a carbon black and a mineral filler gives the polymer compositions a lower surface resistivity as opposed to the one without a mineral filler incorporated therein.

TABLE I

| (Composition, PARTS by weight) | A | B | C | D | E | F | G |
|---|---|---|---|---|---|---|---|
| PPE-A | 62 | 58 | 58 | 58 | 65 | 58 | 65 |
| HIPS | 26 | 25 | 25 | 25 | 25 | 35 | 28 |
| ADA* | 7 | 7 | 7 | 7 | — | 7 | 7 |
| Talc | 5 | 10 | — | — | 10 | — | 10 |
| Wollastonite | — | — | 10 | — | — | — | — |
| Mica | — | — | — | 10 | — | — | — |
| Acetylene black | 18 | 18 | 18 | 18 | 18 | 18 | 1 |
| (Physical Properties 3.2 mm Test Plate) | | | | | | | |
| Tensile Strength ($\times 10$ kg/cm$^2$) | 51 | 51 | 56 | 50 | 60 | 62 | 68 |
| Flexural Strength ($\times 10$ kg/cm$^2$) | 97 | 81 | 99 | 83 | 95 | 90 | 100 |
| Izod Impact Stength Un-notched, kg · cm/cm$^2$) | 17 | 15 | 19 | 14 | 16 | 22 | 62 |
| Surface Resistivity ($\times 10^5$ ohm) | 12 | 5 | 3 | 5 | 6 | 90 | 10$^{11}$ |

*Adipic dianilide

PREPARATION OF GRAFT RUBBER

Graft Rubbers used in the examples herein are prepared in the following manner;

1) Graft Rubber A (styrene/acylonitrile grafted EPDM)

In a 100 liter stainless steel autoclave, 10 kg of EPDM (Esprene ® E 502, ethylene/propylene/ethylidene norbornene terpolymer rubber, made by Sumitomo Kagaku) and 45 kg of demineralized water are fed and intensively stirred by a stirrer.

While stirring, a solution of 75 grams of benzoyl peroxide in 3.35 kg of styrene and 0.2 kg of acrylonitrile, and a solution of 400 grams of polyvinyl alcohol (Gosenol GL-05 made by Nihon Gosei Co., Ltd.) as a dispersion stabilizer in 10 kg of demineralized water are added, in order.

The mixture is stirred for one hour at a room temperature to render the impregnation of styrene, acrylonitrile and benzoyl peroxide into the EPDM. Then, the grafting reaction is allowed at 90 degree centigrade for 2 hours.

After the reaction is over, the resulting product is filtered, washed with water and dried to obtain about 13.3 kg of Graft Rubber (Graft Rubber A).

2) Graft Rubber B

Graft Rubber B is prepared in the same manner as in the preparation of Graft Rubber A except that EPDM is substituted with EPR (Sumitomo Kagaku's Esprene E-100).

3) Graft Rubber C

Graft Rubber C is prepared in the same manner as in the preparation of Graft Rubber B except that acrylonitrile is substituted with methylmethacrylate.

4) Graft Rubber D

Graft Rubber D is prepared in the same manner as in the preparation of Graft Rubber C except that EPR is substituted with ethylene butene-1 copolymer rubber (hereinafter referred to as EBR; EBR used herein is Sumitomo Kagaku's ethylene butene-1 copolymer rubber having mooney viscosity of 36 measured at 121° C. and ethylene content of about 82 wt % and butene-1 content of about 18 wt %)

5) Graft Rubber E

Graft Rubber E is prepared in the same manner as in the preparation of Graft Rubber D except that EBR is substituted with EPDM and the quantity of the rubber, styrene and methylmethacrylale charged are changed as shown in each column of Table V, and that the quantity of benzoyl peroxide is adjusted in proportion to the total quantity of, the rubber, styrene, and the functional monomer.

6) Graft Rubber F

Graft Rubber F is prepared in the same manner as in the preparation of Graft Rubber E except that methyl methacrylate is substituted with acrylonitrile, and that the ratio of styrene and acrylonitrile is changed as shown in Table V.

7) Graft Rubber G

Graft Rubber G is prepared in the same manner as in the preparation of Graft Rubber F except that acrylonitrile is substituted with styrene.

EXAMPLE-II

Nine thermoplastic compositions are prepared by blending, using a tumbler mixer, poly(2,6-dimethyl-1, 4-phenylene) ether having a reduced viscosity of 0.38 dl/g (hereinafter referred to as PPE-B) measured at 25° C. in a chloroform solution of 0.5 g/dl concentration; triphenylphosphate (TPP) and/or adipic dianilide (ADA) and/or mineral oil if employed; acetylene black; either talc (Micro Ace X500 made by Nihon Talc) or mica, with Graft Rubber A; Graft Rubber B; Graft Rubber C; Graft Rubber D; Graft Rubber E; Graft Rubber F, or Graft Rubber G.

The formulation recipe is shown in Table II wherein the ratio of the ingredients is shown in parts by weight.

The resulting samples are individually extruded, pelletized and injection molded in the same manner as in Example I. The molded test plates are tested for their comparative physical properties and electroresistivity at room temperature.

The data obtained are shown in Table II.

TABLE II

| (Composition, PARTS by weight) | A | B | C | D | E | F | G | H | I |
|---|---|---|---|---|---|---|---|---|---|
| PPE-B | 80 | 80 | 80 | 80 | 75 | 85 | 80 | 85 | 85 |
| TPP | 5 | 5 | — | — | — | — | 5 | — | — |
| ADA* | — | — | 5 | 5 | 5 | — | — | — | — |
| Mineral oil | 5 | 5 | 5 | 5 | 5 | — | — | — | — |
| Talc | 10 | 10 | 10 | — | 10 | 10 | 10 | — | 10 |
| Mica | — | — | — | 10 | — | — | — | 10 | — |
| Graft rubber A | 10 | — | — | — | — | — | — | — | — |
| B | — | 10 | — | — | — | — | — | — | — |
| C | — | — | 10 | — | — | — | — | — | — |
| D | — | — | — | 10 | — | — | — | — | — |
| E | — | — | — | — | 15 | — | — | — | — |
| F | — | — | — | — | — | 15 | — | — | — |
| G | — | — | — | — | — | — | 15 | 15 | 15 |
| Acetylene black | 25 | 25 | 25 | 25 | 25 | 25 | 25 | 25 | 25 |
| (Physical Properties 3.2 mm Test Plate) | | | | | | | | | |
| Tensile Strength ($\times 10$ kg/cm$^2$) | 47 | 47 | 51 | 50 | 48 | 43 | 48 | 46 | 41 |
| Flexural Strength ($\times 10$ kg/cm$^2$) | 67 | 64 | 69 | 69 | 63 | 60 | 65 | 67 | 62 |
| Izod Impact Stength (Un-notched, kg · cm/cm$^2$) | 25 | 27 | 26 | 23 | 24 | 23 | 24 | 22 | 23 |
| Surface Resistivity ($\times 10^4$ ohm) | 5 | 7 | 4 | 6 | 3 | 6 | 8 | 6 | 5 |

*Adipic dianilide

PREPARATION OF CHEMICALLY CONPATIBILIZED POLYPHENYLENE ETHER/OLEFIN POLYMER COMPOSITION (HEREINAFTER REFERRED TO AS PPE-PO).

1) PPE-PO, A 85 parts by weight of PPE-B, 0.1 parts by weight of peroxide, 4 parts by weight of diallylamine and 1 parts by weight of styrene, are tumbled and fed to the first feed port of Toshiba Kikai's TEM 50 twin screw extruder and 15 parts by weight of maleated ethylene propylene rubber (EPR) having a mooney viscosity of 15 measured at 121° C., and containing about 60 weight % of ethylene and 40 weight % of propylene is fed to the second feed port of the extruder and extruded at a temperature of about 330° C. and pelletized to obtain compatibilized PPE-polyolefin composition A.

2) PPE-PO, B

PPE-PO, B is prepared in the same manner as in the preparation of PPE-PO, A, except that maleated EPR is substituted with maleated ethylene butene-1 rubber (EBR) having a mooney viscosity of about 15 measured at 121° C. and containing about 30 weight % of butene-1 and 70 weight % of ethylene.

3) PPE-PO, C

PPE-PO, C is prepared in the same manner as in the preparation of PPE-PO, A, except that maleated EPR is substituted with ethylene-ethylacrylate-maleic anhydride terpolymer (ATO chem's Lotader 4700).

4) PPE-PO, D

PPE-PO, D is prepared in the same manner as in the preparation of PPE-PO, A, except that diallyl amine is substituted with maleic anhydride, and maleated EPR with glicidylmethacrylate grafted EPR, having a money viscosity of 15 measured at 121° C., and containing about 60 weight % of ethylene and 40 weight % of propylene.

5) PPE-PO, E

PPE-PO, E is prepared in the same manner as in the preparation of PPE-PO, D, except that glicidylmethacrylate grafted EPR is substituted with ethylene-methylacrylate-glicidylmethacrylate terpolymer having melt index measured at 190° C. and at 2.16 kg/cm$^2$ load, of 15 g/10 min., containing about 65 weight % of ethylene, about 15 weight % of methylacrylate, and about 20 weight % of glicidylmethacrylate.

6) PPE-PO, F 85 parts by weight of maleated PPE-B and 0.3 parts by weight of maleic anhydride are tumbled and fed to the first feed port of Toshiba Kikai's TEM 50 twin screw extruder, and 15 parts by weight of maleated EPR containing about 0.5% of maleicanhydride and 1 part by weight of diaminododecane are tumbled, and fed to the second feed port of the extruder, and extruded at a temperature of about 330° C. and pelletized, to obtain PPE-PO, F.

7) PPE-PO, G 85 parts by weight of PPE-B and 3 parts by weight of Sumitomo Kagaku's SumiEpoxy® ESCN-195X are tumbled and fed to the first feed port of the extruder and 15 parts by weight of maleated EPR was fed to the second feed port of the extruder and extruded at a temperature of about 330° C. and pelletized to obtain PPE-PO, G.

In the preparation of the above described compatibilized polyphenylene ether/olefin polymer compositions, the feed rate of the raw materials to the extruder is so adjusted to maintain the product output at about 40 Kg/Hr.

EXAMPLE-III

Seven thermoplastic compositions are prepared by blending, using a tumbler mixer, 10 parts by weight of either talc (Micro Ace X500) or mica, 5 parts by weight of mineral oil, 9 parts by weight of either TPP or ADA, 25 parts by weight of acetylene black, with 76 parts by weight of PPE-PO, A; PPE-PO, B; PPE-PO, C; PPE-PO, D; PPE-PO, E; PPE-PO, F; or PPE-PO, G. The resulting samples are individually extruded, pelletized, injection molded in the same manner as in Example-I to obtain test plates. The molded test plates are tested for their comparative physical properties and surface resistivity at room temperature. The data obtained are shown in Table III.

TABLE III

| (Composition, PARTS by weight) | A | B | C | D | E | F | G |
|---|---|---|---|---|---|---|---|
| PPE-PO, A | 76 | — | — | — | — | — | — |
| B | — | 76 | — | — | — | — | — |
| C | — | — | 76 | — | — | — | — |
| D | — | — | — | 76 | — | — | — |
| E | — | — | — | — | 76 | — | — |
| F | — | — | — | — | — | 76 | — |
| G | — | — | — | — | — | — | 76 |
| TPP | 9 | 9 | — | 9 | 9 | 9 | — |
| ADA* | — | — | 9 | — | — | — | 9 |
| Mineral oil | 5 | 5 | 5 | 5 | 5 | 5 | 5 |
| Talc | 10 | — | 10 | 10 | — | 10 | 10 |
| Mica | — | 10 | — | — | 10 | — | — |
| Acetylene black | 25 | 25 | 25 | 25 | 25 | 25 | 25 |
| (Physical Properties 3.2 mm Test Plate) | | | | | | | |
| Tensile Strength ($\times 10$ kg/cm$^2$) | 43 | 43 | 48 | 44 | 43 | 46 | 49 |
| Flexural Strength ($\times 10$ kg/cm$^2$) | 45 | 48 | 45 | 46 | 45 | 55 | 60 |
| Izod Impact Stength (Un-notched, kg · cm/cm$^2$) | 29 | 25 | 30 | 27 | 24 | 29 | 28 |
| Surface Resistivity | 7 | 4 | 8 | 6 | 5 | 8 | 6 |

TABLE III-continued

| (Composition, PARTS by weight) | A | B | C | D | E | F | G |
|---|---|---|---|---|---|---|---|
| ($\times 10^3$ ohm) | | | | | | | 5 |

*Adipic dianilide

EXAMPLE-IV

Four thermoplastic compositions are prepared by blending, using a tumbler mixer, 75 parts by weight of PPE-B, 5 parts by weight of TPP, 5 parts by weight of mineral oil, 5 parts by weight of either talc (Micron White 5000S) or wollastonite, 8 parts by weight of Ketjen Black EC 600JD with 10 parts by weight of Kraton G 1652, or 10 parts by weight of Kraton G 1701 or a combination of 5 parts by weight of Kraton G 1701 and 5 parts by weight of EPR.

The resulting samples are individually extruded, pelletized and injection molded in the same manner as in Example-I to obtain test plates. The injection molded test plates are tested for their comparative physical properties and surface resistivity at room temperature.

The data obtained are shown in Table IV.

TABLE IV

| (Composition, PARTS by weight) | A | B | C | D |
|---|---|---|---|---|
| PPE-B | 75 | 75 | 75 | 75 |
| TPP | 5 | 5 | 5 | 5 |
| Mineral oil | 5 | 5 | 5 | 5 |
| Talc | 5 | — | 5 | — |
| Wollastonite | — | 5 | — | 5 |
| Kraton G 1652 | 10 | — | — | 10 |
| Kraton G 1701 | — | 10 | 5 | — |
| EPR | — | — | 5 | — |
| Ketjen black | 8 | 8 | 8 | 8 |
| (Physical Properties 3.2 mm Test Plate) | | | | |
| Tensile Strength ($\times 10$ kg/cm$^2$) | 70 | 65 | 60 | 71 |
| Flexural Strength ($\times 10$ kg/cm$^2$) | 76 | 67 | 65 | 70 |
| Izod Impact Stength (Un-notched, kg.cm/cm$^2$) | 28 | 23 | 20 | 29 |
| Surface Resistivity ($\times 10^5$ ohm) | 3 | 8 | 5 | 7 |

TABLE V

| | Material charged | | | | Analytical Result of Graft Rubbers | | |
|---|---|---|---|---|---|---|---|
| | Ethylene -olefine copolymer | | | | Ethylene -olefine copolymer | AN[1] | MMA[2] |
| Species | weight (kg) | Styrene | AN[1] | MMA[2] | wt % | wt %[3] | wt %[3] |
| A EPDM | 10 | 3.35 | 0.20 | — | 75.3 | 5.1 | — |
| B EPR | 10 | 3.35 | 0.20 | — | 76.0 | 4.8 | — |
| C EPR | 10 | 3.35 | — | 0.20 | 74.9 | — | 5.6 |
| D EBR | 10 | 3.35 | — | 0.20 | 75.1 | — | 5.2 |
| E EPDM | 5 | 5.3 | — | 0.50 | 48.2 | — | 7.5 |
| F EPDM | 5 | 5.5 | 0.30 | — | 47.9 | 4.8 | — |
| G EPDM | 5 | 5.8 | — | — | 47.6 | — | — |

[1] acrylonitrile
[2] methylmethacrylate
[3] calculated by the formula: 100 × AN(MMA)/[AN(MMA) + styrene]

We claim:

1. A polymer composition consisting essentially of,

A) a polyphenylene ether resin and,

B) optionally a styrene resin and,

C) an impact strength improving amount of one or more of impact strength improving polymer(s), wherein the polymer(s) is selected from the group consisting of a styrene grafted polyolefin rubber, a styrene/unsaturated functional monomer co-grafted polyolefin rubber, a functionalized ethylene alpha-olefin(polyene) copolymer rubber, and a copolymer or terpolymer of ethylene and at least one unsaturated functional monomer and, D) from about 5 to about 20 parts by weight of at least one mineral filler selected from the group consisting of talc, mica, and wollastonite based on 100 parts by weight of the total of the polymers, A) the polyphenylene ether resin, B) the styrene resin, and C) the impact strength improving polymer and, E) from about 5 parts to about 40 parts by weight of a carbon black based on the total of the polymers, A) the polyphenylene ether resin, B) the styrene resin, and C) the impact strength improving polymer and, F) optionally a plasticizing amount of one or more of plasticizer(s), characterized in that the surface resistivity of the composition is lower than about $10^{10}$ ohm.

2. A thermoplastic composition according to claim 1 wherein the polyolefin rubber is an ethylene alpha-olefin (polyene) copolymer rubber.

3. A thermoplastic composition according to claim 1 wherein the said composition comprises from about 5 parts to about 25 parts by weight of one or more of plasticizer(s) based on the total of the polymers, A) the polyphenylene ether resin and, B) the styrene resin.

4. A thermoplastic composition according to any of claims 1, 2 and 3 wherein the polyphenylene ether resin is poly(2,6-dimethyl-1,4-phenylene)ether.

5. A fabricated article made from the thermoplastic composition according to any of claims 1, 2 and 3 for use in an electrical/electronic application.

6. The fabricated article of claim 5, wherein the polyphenylene ether resin is poly(2,6-dimethyl-1,4-phenylene)ether.

* * * * *